United States Patent [19]

Sherman et al.

[11] Patent Number: 4,600,511
[45] Date of Patent: Jul. 15, 1986

[54] TWO-LAYER FLUID FILTER WITH SPACER

[75] Inventors: Victor L. Sherman, Orange, Conn.; Ojars W. Pincers, New York, N.Y.

[73] Assignee: Allomatic Industries, Inc., Woodside, N.Y.

[21] Appl. No.: 642,370

[22] Filed: Aug. 20, 1984

[51] Int. Cl.[4] .............................................. B01D 27/08
[52] U.S. Cl. ................................... 210/316; 210/317; 210/455; 210/495
[58] Field of Search ............... 210/314, 315, 316, 317, 210/435, 445, 450, 455, 461, 486, 488, 489, 495, 168, 416.5; 55/482, 483

[56] References Cited

U.S. PATENT DOCUMENTS

| | | | |
|---|---|---|---|
| 1,989,795 | 2/1935 | Fellows | 210/165 |
| 3,168,468 | 2/1965 | Jagdmann | 210/445 |
| 3,335,867 | 8/1967 | Perl | 210/314 |
| 3,371,793 | 3/1968 | Fowler | 210/445 |
| 3,515,280 | 6/1970 | Parker | 210/314 |
| 3,784,011 | 1/1974 | Ward | 210/168 |
| 4,136,011 | 1/1979 | Joseph et al. | 210/168 |
| 4,264,443 | 4/1981 | Anderson et al. | 210/168 |
| 4,328,097 | 5/1982 | Whaley et al. | 210/315 |
| 4,352,737 | 10/1982 | Taniguchi | 210/455 |
| 4,387,023 | 6/1983 | Napier | 210/168 |
| 4,402,827 | 9/1983 | Joseph | 210/314 |
| 4,410,341 | 10/1983 | Edwards et al. | 210/445 |
| 4,450,081 | 5/1984 | Anderson et al. | 210/445 |

*Primary Examiner*—Richard V. Fisher
*Assistant Examiner*—Wanda L. Millard
*Attorney, Agent, or Firm*—James & Franklin

[57] ABSTRACT

In a fluid filter having a filtering medium comprising upper and lower layers defining therebetween a fluid receiving space into which the fluid to be filtered is introduced, and in which the filter supporting structure comprises a part which extends through both of the layers of the filtering medium, a spacer surrounds that part and retains the filter medium layers spaced from one another thereat, thereby significantly to increase the filtering capacity of the filter unit.

16 Claims, 4 Drawing Figures

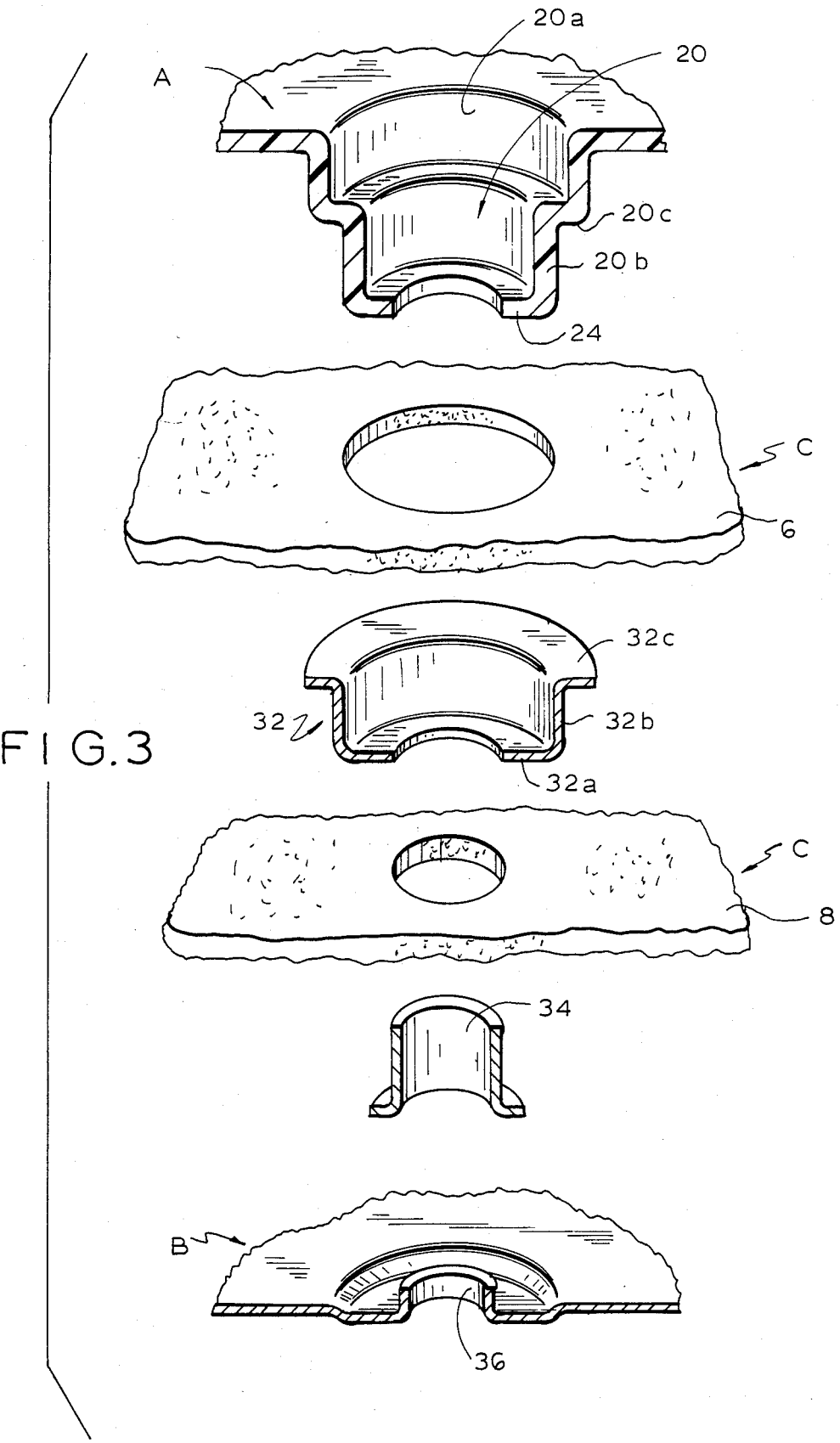

TWO-LAYER FLUID FILTER WITH SPACER

The present invention relates to the construction of a fluid filter, such as one used for the filtration of transmission fluid in automotive vehicles, in which the filtration is performed by a filter sheet comprising upper and lower layers defining therebetween a fluid receiving space into which the fluid to be filtered is introduced, and in particular to increasing the filtration capacity of such a unit.

Filter units of the type under discussion generally comprise a structural framework within which a filtration medium, usually in sheet form, is mounted, the filter unit comprising a fluid receiving space on one side of the filter sheet, into which space the fluid to be filtered is introduced, the fluid then passing through the filter sheet into an outlet space, from which the filtered fluid escapes from the housing. In one quite widely used construction of this type, the filter sheet is provided in two layers, as by being doubled over into a "bag" or "pocketbook" configuration, to define between the layers the fluid receiving space into which the fluid to be filtered is initially received. With this doubled-over type of filter sheet arrangement, the effective filtration area is maximized. However, particularly when the filter unit is shaped to a more or less flat configuration, as is generally the case, several factors have minimized the effect of that maximization of filtration area.

First, the filter units are usually formed of two structural walls designed to be secured to one another along a horizontal plane with the filter sheet at its periphery being sealed to the frame pieces at the horizontal joining line. This brings the two layers of the filters close to one another at the periphery of the fluid receiving space, thus minimizing the volume of that fluid receiving space and hence the volume of the fluid which can be received between and passed through the filter sheet.

Second, the two layers of the filter sheet can, of course, separate from one another to a greater extent towards the center of the unit, thereby, at least theoretically, to produce a fluid receiving space of acceptable volume. However, means must be provided to secure the fluid filter in place in the vehicle where it is to be used, and that means usually comprises a part which extends through the fluid receiving space, and the filter sheet must be in a sealing relationship with that part. In the past this has meant that the two layers of the filter sheet, adjacent the part, are clamped against one another, in a manner analogous to the way they are clamped against one another at their periphery. This, of course, again restricts the degree to which those layers can space themselves from one another and thus significantly restricts the volume of the fluid receiving space.

The restriction of filtering capacity produced by these design problems is often manageable, even though undesirable, at normal operating temperatures, but as operating temperatures drop, causing the liquid being filtered to become more viscous, the problem intensifies.

It is the prime object of the present invention to devise a fluid filter assembly construction which will, without affecting the external dimensions or mounting characteristics of a fluid filter assembly, maximize the filtration efficiency thereof.

It is another object of the present invention to provide a construction in which, in a fluid filter assembly comprising a filter sheet having upper and lower layers defining therebetween a fluid receiving space, to ensure that those two layers are significantly and positively spaced from one another except at their periphery.

It is a further object of the present invention to devise a fluid filter assembly construction where the filter sheet is doubled over into a "bag" or "pocketbook" configuration, with the upper and lower layers thereof receiving therethrough structure for the mounting of the fluid filter assembly, and in which those upper and lower layers are sealed to that mounting structure at points vertically spaced from one another, thereby positively to ensure maximization of the volume of the fluid receiving space between those layers of the filter sheet.

It is yet another object of the present invention to accomplish the above by a simple, sturdy and inexpensive construction.

In accordance with the present invention, the upper wall of the supporting structure of the filter assembly has, as is conventional, a part which extends down toward the lower wall of that assembly and passes through the upper layer of the two-layer filter sheet, whereas the lower filter sheet layer is sealed to that part in essentially conventional fashion. A spacer surrounds that part, and the upper layer of the filter is held by that spacer above the lower layer, and a seal is effected between the upper filter layer and the part that extends therethrough. Hence the body of the filter proper is maintained in an opened-up condition, with the upper layer positively spaced from the lower layer. This ensures that the volume of the fluid receiving space defined between the upper and lower layers of the filter sheet is maximized and this greatly improves the filtration capacity of the unit, particularly at lower temperatures.

To the accomplishment of the above, and to such other objects as may hereinafter appear, the present invention relates to the construction of a fluid filter assembly as defined in the appended claims and as described in this specification, taken together with the accompanying drawings, in which:

FIG. 3 is a three-quarter perspective exploded view, partially in cross-section, of the embodiment of FIG. 1.

Figure 1:
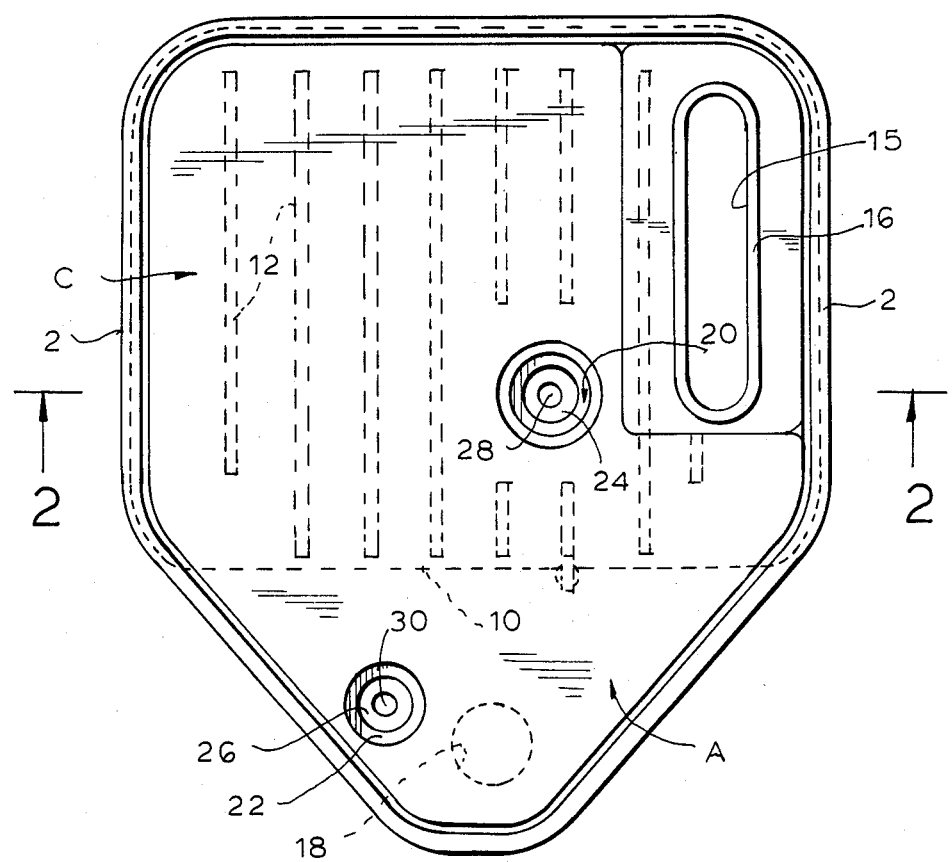
FIG. 1 is a top plan view of a typical embodiment of the present invention.

For purposes of illustration the invention is here disclosed and embodied in a flat-type filter such as is used for filtering the transmission fluid of automobiles. The filter assembly comprises a top cover wall generally designated A and a bottom cover wall generally designated B (the terms "top" and "bottom" are arbitrarily defined), the former being made of plastic and the latter of metal, sealingly joined to one another around their periphery by crimping the bottom cover wall B, at 2, over a bead 4 formed on the top cover wall A. The filtration medium, generally designated C, is defined by an upper layer 6 and a lower layer 8, those two layers preferably being formed from a single sheet of filter material folded back on itself along a line 10 (see FIG. 1). The layers 6 and 8 of the filters are engaged and sealingly compressed along their peripheries between the upper cover wall A and the lower cover wall B at the crimped portion thereof, so that the space 9 between the two layers 6 and 8 defines a fluid receiving space of appreciable volume, that volume, however, depending upon the layers 6 and 8 being vertically spaced from one another. The upper cover wall A is provided with downwardly depending ribs 12 which space the upper layer 6 from the upper cover wall A, thereby to produce a chamber 14 therebetween. The lower cover wall B is provided with upwardly stamped ribs 12a (see FIG. 2) which space the lower layer 8 from the lower cover wall B, thereby to form a chamber 14a therebetween. The upper cover wall A is provided with an elongated opening 15 (see FIG. 1), and the upper filter layer 6 is sealingly engaged around that opening, as by being crimped thereto by an appropriately shaped metal eyelet 16, the opening 15 thus functioning as an inlet opening to the chamber 9 inside the filter sheet 6, 8. The lower cover wall B is provided with an opening 18 (see FIG. 1) which communicates with the space between the upper and lower cover walls A and B outside the filtration medium C, and therefore with the chambers 14 and 14a, and functions as an exit opening for the filter. If desired, and as is conventional, the bottom cover wall B may be provided with another through opening (not shown) located beneath the filter element C, to function, for instance, as a bypass.

In order to provide for mounting a filter assembly in place, the plastic upper cover wall A is provided with a pair of depending boss-like parts 20 and 22 which extend it down to the bottom wall B, those parts having bottom walls 24 and 26 respectively provided with openings 28 and 30 respectively which register with openings in the lower wall B, and through which fastening screws are adapted to pass. The part 26 is located beyond the filtration medium C, and therefore poses no problem insofar as the functioning of the filter medium C is concerned. All that is necessary is to ensure that the top wall part 26 and the bottom wall B are sealingly engaged when the filter is in use. As a practical matter, that sealing engagement is effected by the compressive effect of the fastening screw which passes through the opening 30.

Part 20, however, must pass through the filtration medium C, and both layers 6 and 8 of the filtration medium C must be sealed thereto, so that fluid introduced into the chamber 9 will have to pass through the filter sheet and be filtered thereby, and cannot escape from the chamber 9 without being filtered. In the past, that seal has been accomplished at the lower end of the part 20 for both of the filter layers 6 and 8, and this necessarily reduced the volume of the chamber 9 by forcing the layers 6 and 8 close to one another along a substantial portion of their registering areas.

In accordance with the present invention, that problem is solved in a very simple, sturdy and reliable manner by causing only the lower layer 8 to be sealed closely adjacent the bottom cover wall B, and by ensuring that the upper layer 6 is, at the part 20, sealed to the part 20 at a point located well above the lower layer 8. This is done through the use of a spacer 32 which surrounds the part 20 and sealingly engages the upper filter layer 6 and seals it to part 20, so that fluid cannot escape at that joint.

Figure 2:
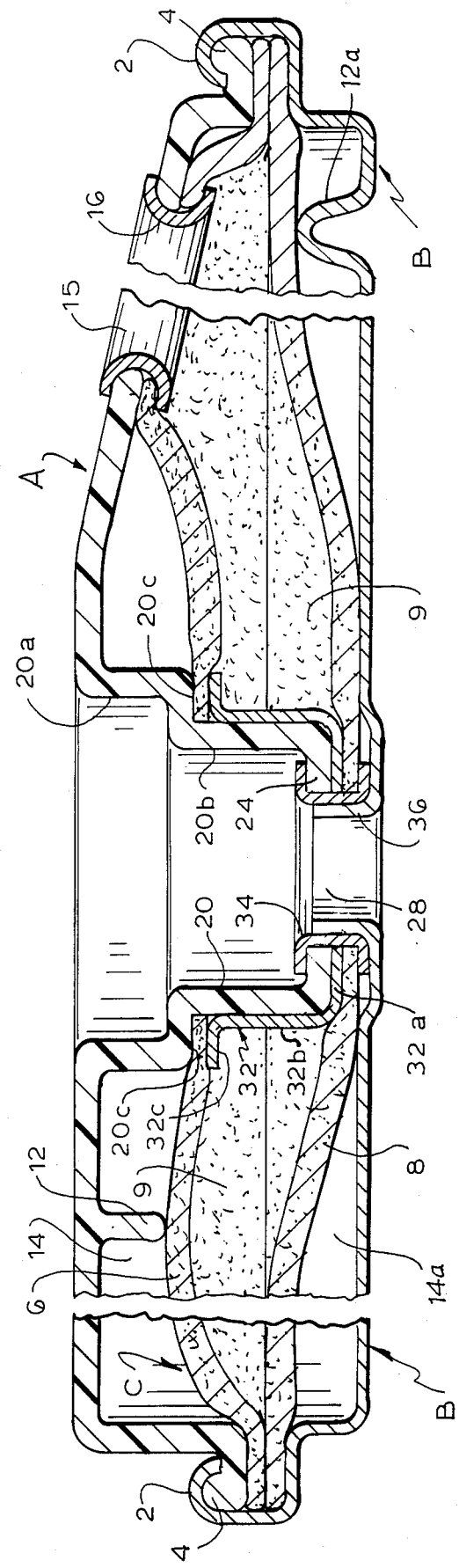
FIG. 2 is a cross-sectional view taken along the line 2—2 of FIG. 1.

In the embodiment of FIGS. 1–3 the part 20 is stepped, being defined by a relatively large diameter portion 20a and a smaller diameter portion 20b, thereby producing a downwardly facing abutment surface or ledge 20c at a point spaced well above the lower cover wall B. The spacer 32 comprises a bottom apertured wall defining an inwardly extending flange 32a, a vertical wall 32b and an outwardly extending flange 32c, the latter producing an upwardly facing abutment surface. The upper filter sheet 6, around the portion 20b of the part 20, is captured and sealingly compressed between the downwardly facing abutment surface or ledge 20c of the upper cover wall A and the upwardly facing abutment surface defined by the outwardly extending flange 32c of the spacer 32. Apart from the flange 32c, the remainder of the spacer 32 surrounds part 20, the apertured wall 32a of the spacer 32 engaging and lying just below the apertured flange 24 of the part 20. The lower filter 8 is received directly beneath the spacer wall 32a, and an eyelet 34 is crimped or otherwise sealingly engaged around the flanges 24 and 32a and the lower filter layer 8, in order to sealingly secure the parts together. The lower wall B of the assembly has an upwardly extending part 36 which engages the eyelet 34.

Hence although the part 20 passes through the filtration medium C, the layers 6 and 8 thereof are positively spaced from one another, thereby ensuring that the chamber 9 will have a substantial volume and that when fluid enters that chamber 9 to be filtered, that is to say, to pass from the chamber 9 into the chambers 14 and 14a by flowing through the filter sheet itself, a very substantial proportion of the filter sheet area will be effective to produce filtration. It has been found that when the filter of the present invention is operated at normal operating temperatures its filtration capacity is increased by about 25% over the prior art where the filter layers 6 and 8 are pressed together at the bottom of the unit to form a seal and when the filter operates at normal temperatures. When the filter operates at lower temperatures the improvement in filtration capacity goes as high as 200%.

Figure 4:
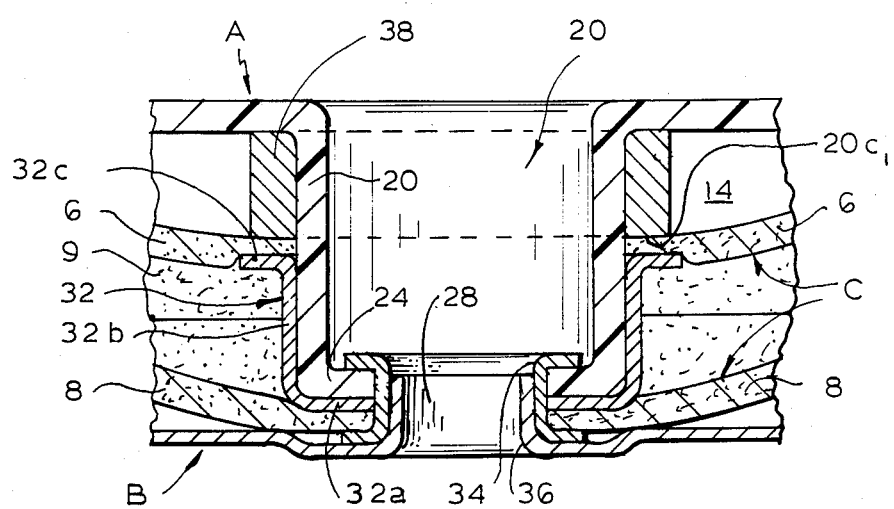
FIG. 4 is a view similar to FIG. 2 but showing an alternative embodiment of the present invention.

In the embodiment of FIG. 2 the downwardly facing abutment surface 20c against which the upper filter layer 6 is sealingly pressed is formed by suitably shaping the part 20 when it is molded. FIG. 4 discloses an alternate arrangement in which the part 20 is not thus formed, but is of uniform diameter. In this alternate embodiment a ring 38 is provided which surrounds the part 20 at its upper extremity, the lower surface of that ring 38 defining the downwardly facing abutment surface $20c_1$ corresponding to the ledge 20c in FIG. 2.

Through the structurally simple and sturdy expedient of providing a properly shaped spacer 32, a considerable improvement is thus achieved in the filtering capability of the unit, particularly at lower operating temperatures.

When, in the specification and claims of this document an engagement or sealing relationship is called for, that term comprehends both an engagement or sealing relationship that exists in the filter per se and an engagement or sealing relationship that comes about when the filter is mounted in place. As here specifically disclosed it is the action of the head of the mounting screw passing through the aperture 20 which presses eyelet 34 against the bottom wall B to ensure that an engagement or sealing relationship is attained, that being an economical way of attaining the desired relationship, since it is only when the filter is mounted in place that fluid passes therethrough, the filter structure per se therefore defining an embryonic engagement or sealing arrangement which is made actual by the act of mounting the filter. An actual sealing engagement or sealing relationship could exist in the filter per se, or other means could be employed to produce an embryonic sealing engagement and to convert it to an actual engagement or sealing relationship, all without departing from the present invention.

While but a limited number of embodiments of the present invention have been here disclosed, and in connection with a filter assembly of particular configuration, the instant invention is not limited thereto, and it will be apparent that many variations may be made therein, all within the scope of the instant invention as defined in the appended claims.

We claim:

1. In a fluid filter assembly comprising upper and lower walls sealingly connected to one another to define a chamber, said walls having means defining both a fluid inlet opening and a fluid outlet opening spaced therefrom, and a filter sheet sealingly received inside the chamber and comprising upper and lower layers defining therebetween a fluid receiving space in fluid communication with said inlet opening, said outlet opening being located outside said space, one of said walls having a part which extends into said chamber through said filter sheet, toward the other of said walls, the improvement which comprses a first sealing relationship between one of said filter sheet layers and said wall part, a spacer surrounding a vertical portion of said wall part and extending toward said one of said walls and terminating in a spacer abutment surface, and a second sealing relationship between the other of said filter sheet layers and said abutment surface and said one wall, whereby said layers of said filter sheet are positively spaced from one another at said wall part.

2. The fluid filter assembly of claim 1, in which said wall part operatively engages said other wall and there is an aperture through the operatively engaging sections of said wall part and said other wall through which a filter fastening element can pass.

3. The fluid filter assembly of claim 1, in which said spacer has a flange sealingly engaged with said wall part and said other of said walls.

4. The fluid filter assembly of claim 1, in which said wall part has an abutment surface spaced from and facing said other wall, said second sealing engagement being with said wall part abutment surface.

5. The fluid filter assembly of claim 1, in which said wall part comprises, in order extending from said one wall toward the other, a first section of relatively large width, a second section of narrower width defining with said first section a wall part abutment surface, and an inwardly extending surface, said first sealing engagement involving said inwardly extending surface and said second sealing engagement involving said wall part abutment surface.

6. The fluid filter assembly of claim 5, in which said spacer comprises a ring with an outwardly extending upper flange and inwardly extending lower surface, said first sealing engagement involving said lower surface and said second sealing engagement involving said upper flange.

7. The fluid filter assembly of claim 5, in which said spacer comprises a ring with an outwardly extending upper flange and an inwardly extending lower surface, said first sealing engagement involving said lower surface and said second sealing engagement involving said upper flange, said one filter sheet layer being operatively sealingly engaged with said lower surface, said other filter sheet layer being sealingly engaged between said upper flange and said wall part abutment surface.

8. In the fluid filter assembly of claim 2, securing means including an eyelet passing through said aperture for at least in part effecting said first sealing engagement.

9. In the fluid filter assembly of claim 2, securing means including an eyelet passing through said aperture for at least in part effecting said first sealing engagement, said eyelet sealingly engaging said wall part and said one filter sheet layer.

10. In the fluid filter assembly of claim 2, securing means including an eyelet passing through said aperture for at least in part effecting said second sealing engagement, said eyelet sealingly engaging said wall part and said one filter sheet layer, said other wall engaging said eyelet.

11. In the fluid filter assembly of claim 6, in which said wall part operatively engages said other wall and there is an aperture through the operatively engaging sections of said wall part and said other wall through which a filter fastening element can pass, securing means including an eyelet passing through said aperture for at least in part effecting said second sealing engagement.

12. In the fluid filter assembly of claim 6, in which said wall part operatively engages said other wall and there is an aperture through the operatively engaging sections of said wall part and said other wall through which a filter fastening element can pass, securing means including an eyelet passing through said aperture for at least in part effecting said second sealing engagement, said eyelet sealingly engaging said wall part, said one filter sheet layer and said inwardly extending lower surface of said ring.

13. In the fluid filter assembly of claim 6, in which said wall part operatively engages said other wall and there is an aperture through which the operatively engaging sections of said wall part and said other wall through which a filter fastening element can pass, securing means including an eyelet passing through said aperture for at least in part effecting said second sealing engagement, said eyelet sealingly engaging said wall part, said one filter sheet layer and said inwardly extending lower surface of said ring, said other wall engaging said eyelet.

14. In the fluid filter assembly of claim 1, spacing means interposed between said one of said filter sheet layers and said one of said walls at said wall part.

15. The fluid filter assembly of claim 14, in which said spacing means comprises an enlarged width portion of said wall part.

16. The fluid filter assembly of claim 14, in which said spacing means comprises a ring surrounding said wall part.

* * * * *